United States Patent Office 3,348,957
Patented Oct. 24, 1967

3,348,957
PROCESS FOR MANUFACTURING
CLAY PRODUCTS
Asoke Chandra Das Chaklader, Vancouver, British Columbia, Canada, and Lawrence G. McKenzie, Spokane, Wash., assignors to Canadian Patents and Development Limited, Ottawa, Ontario, Canada, a corporation of Canada
Filed Oct. 8, 1964, Ser. No. 402,654
9 Claims. (Cl. 106—67)

This invention relates to a process for preparing clay products and to the improved products produced by the process. The term clay products is meant to include products such as, for example, building bricks, blocks, pipes, tiles and refractories of any shape and dimension manufactured from a clay or at least from a mixture of materials including a substantial proportion of a clay.

Currently one of the most common commercial processes employed for manufacturing clay products consists of that wherein the raw materials including a substantial portion of at least one clay are first mixed together in the required predetermined proportions, then the resultant mixture is ground, in either a moist or dry state, to the required consistency which is usually quite critical. After grinding the mixture is shaped into the required form in a suitable forming apparatus and then it is usually necessary to dry the formed mixture. Finally the formed, dried mixture is fired, or sintered as this step is sometimes called, to achieve the required product strength.

The firing of the formed mixture usually involves temperatures of from about 1000° C. such as is used normally for firing building bricks up to about 1350° C. or higher (i.e. 1500° C.) which is the temperature commonly employed for firing high heat-duty fireclay refractories. The firing normally takes place over a rather long period of time of from about 12 up to about 48 hours. The resultant product will normally have a compressive strength of up to 3000 to 7000 p.s.i. with such strength being dependent to some extent directly on the firing temperature utilized.

Bearing in mind the wide-spread use of clay products, it would obviously be desirable to improve the above-outlined known process in a manner which would result in an equally good or improved clay product at a lower cost through the use of a more efficient process resulting from such modifications as a decrease in the number of steps involved, a decrease in the criticality of certain steps and a decrease in the time and temperature needed for firing.

One suggestion for improving this process which has been proposed consists of forming the mixture under pressure while it is being fired or sintered. In this modified process the usual known sintering temperatures, that is those of 1000° C. and above, are employed and a pressure of the order of 1000 to 2000 p.s.i. is employed. Also the starting materials are usually calcined at a temperature of about 1000° C. before forming.

Essentially this so-called hot-pressing of clay products is a modification of the sintering or firing step in currently-used commercial processes for preparing clay products. This modification has not met with wide-spread commercial success because of its expense which is primarily due to the unavailability of suitable die materials which are sufficiently strong, oxidation resistant and abrasion resistant at the usual sintering temperatures, that is from 1000 to 1500° C.

It is an object of the present invention to provide an improved process for manufacturing clay products as well as improved products produced by the process.

More particularly it is an object of the present invention to provide a process for manufacturing clay products which is believed to be a substantial improvement over known processes in that it can greatly simplify currently utilized commercial processes such as those outlined above and furthermore can result in improved products having increased resistance to crushing, that is increased strength. Use of the process of the present invention permits the manufacture of equal or better products at less cost as a result of the use of lower temperatures, shorter firing times, and usually a decrease in the number and criticality of the steps involved.

It has now been discovered that if natural, non-calcined clay as used for forming clay products is heated to cause the clay to undergo at least some dehydroxylation which will occur at less than 1000° C., and the clay subjected to pressure while the dehydroxylation reaction is occurring, the resultant clay product will be of equal or better quality than those clay products obtained by known processes.

Therefore there is provided in accordance with the present invention a process for manufacturing clay products formed from materials of which a major proportion is at least one clay. This clay of any origin, can be either kaolinitic clays i.e. chinaclay (kaolin), ballclay and fireclay or illitic clays such as used in structural clay products, building bricks, tiles etc. In this invention the natural raw material in the form of a clay as mined and crushed with or without other ingredients mixed in, is formed to the required shape in a die and then heated to a temperature sufficient to cause at least some dehydroxylation of the clay to occur, the temperature necessary being less than 1000° C. and depending upon the clay being used, the normal temperature being usually of the order of 700° C. to 800° C. Then pressure is applied while dehydroxylation of the clay is occurring. The heat and pressure can then be removed from the formed product and it will be found that the product, depending upon certain conditions to be noted, will have an equal or better crushing or compressive strength than equivalent products made by known processes and be otherwise equally acceptable. Also normally improved by the process of the invention will be the dimensional tolerances of the finished product.

The clay product may be heated while still in its forming die or may be removed from the die and then otherwise suitably heated to the required temperature. If left in the die then pressure may be readily applied during the dehydroxylation reaction through the die and its associated press. Otherwise other means of applying pressure must be provided.

Normally it will be most convenient to form the clay product in a die and while maintaining pressure on the product, heating it to the necessary temperature whereupon the heat source and the pressure may be removed and the finished product removed from the die.

The particularly surprising aspect of this discovery is that a suitable compressive or crushing strength can be achieved by utilizing a temperature substantially less than the usual sintering temperature for the material involved.

From the commercial standpoint this decrease in the temperature necessary to achieve the required compressive strength is of particular significance in that dies suitable for use in the process of the present invention can be made of materials which are currently readily available at a reasonable cost. Additionally, with less heat being required, heating costs will be substantially reduced.

Furthermore as previously indicated, the products resulting from the process of the present invention can, if required, be made to have a very much higher crushing strength than can be obtained using conventional processes.

A further significant aspect of the process of the invention is the relatively short period of time required to form the clay product as compared with known processes. Generally in known processes a number of hours if not days are required to carry it out, whereas in the process of the present invention it normally takes only a matter of a few seconds to a few minutes depending upon the process used, to prepare the finished product from the raw materials, the time normally being dependent upon the length of time which it takes to bring the mass of material forming the product up to the required temperature, this of course depending upon, in addition to the mass of material, the type of material used and the type of heat source being employed.

In carrying out the process of the invention, any form of heat and pressure source may be used which is sufficient to both exert the required pressure, and heat the raw material forming the finished product to the required temperature in the required time. The process can be carried out in the usual atmosphere, that is air, and the die used should be such as to permit the escape of any gases formed during application of heat and pressure if these are to be applied while the product is still in its forming die as will usually be the situation.

As indicated, the material used to form the clay products may be in its natural form and may consist of any clays both kaolinitic or illitic, of any origin. If required, these clays before being subjected to the process of the present invention, may be mixed with other fillers and/or reinforcing materials such as fibres, asbestos, metal wires etc., sand and metal powders, diatomaceous earth etc., in the usual manner. Although generally speaking the greater the amount of non-clay materials mixed into the natural clay the lower will be the crushing strength of the final product prepared by the process of the invention, depending upon the conditions used it may be possible to enhance other properties of the product by reinforcement. The raw material including the clay should not be calcined before being subjected to the process of the present invention. Once it has been subjected to the process it is immediately ready for use without any further sintering or firing being required.

The temperature employed will depend upon the raw material used. The minimum critical temperature is the temperature at which the dehydroxylation reaction begins for any clay. Provided the pressure is maintained during the period of whole or part of the dehydroxylation reaction any temperature up to 1000° C. can be employed for this process. However, as the dehydroxylation reaction occurs and goes to completion normally before 750° C. both for kaolinitic and illitic clays, it is usually unnecessary to use higher temperatures than 750° C.

As previously indicated the clay material being formed by the process of the present invention must be subjected to pressure during at least part of the clay's dehydroxylation reaction. Pressures of from 500 to 25,000 p.s.i. or even higher may be employed depending upon the crushing strength which is required of the final product. Product crushing strengths of up to 45,000 p.s.i. have been obtained on application of sufficient pressure.

In carrying out the process of the present invention, it is theorized that the very high reactivity of clays during their dehydroxylation is being utilized in order to effect interparticle bonding. It is believed that application of pressure increases the interparticle contact area and thus increases the probability of forming the interparticle bonds. Thus acceptance of this theory would indicate that the temperature necessary to carry out the process of the invention is only that necessary to cause the dehydroxylation of the particular clay being employed in the process. Also indicated is that essentially pressure must be applied during at least part of the dehydroxylation reaction to achieve the required effect.

The invention will be better understood from the description which follows and from the accompanying drawings in which.

The following examples are given for the purpose of illustrating the present invention and in particular its advantages over known processes and also to show the effect which various variables in the process of the invention have on the final product.

EXAMPLE 1

Raw Georgia kaolin, as received, was ground in a porcelain mortar and pestle to pass through a 100 mesh sieve and then compacted into a cylindrical form having an approximate dimension of 1 centimeter in diameter and 1 centimeter in height by means of an ordinary hand-pressed die.

The hot-pressing was carried out in a Phillips induction heating unit, using a graphite die which functioned both as the susceptor and hot-pressing component. The die was heated to the desired temperature in an argon atmosphere and with the specimens of raw material employed it was found that the time needed to reach any temperature up to 700° C. with this heating unit was less than one minute.

A graphite die was weighed when empty and also with the cylindrically-shaped specimen in position, the difference in these weights giving the weight of materials used. The original weight of the specimen was necessary in order to calculate the percent weight loss which occurred during processing of the Georgia kaolin. Then the graphite die with plungers (floating) was placed in position in a press, encased in Vycor tubing and the complete apparatus was flushed with argon for five minutes.

Two different series of experiments were carried out with Georgia kaolin. In the first series a pressure of 3000 p.s.i. was applied when heating was begun. The temperature was raised to the desired level and controlled at that temperature for 20 minutes. Then the power supply was cut off and the pressure released. During cooling the specimen reached a temperature of about 100° C. within two minutes. In the second series the specimen temperature was raised to the desired level and maintaind at that temperature for 20 minutes. The pressure of 3000 p.s.i. was then applied after this soaking period and maintained for 20 minutes at that temperature. The specimen was allowed to cool to room temperature in the die. The graphite die was weighed with the specimen, and also after the specimen was taken out. The difference between these weights gave the weight of the specimen after processing.

The bulk density and crushing strength (in an Instron machine) were determined for all the specimens.

Figure 1:
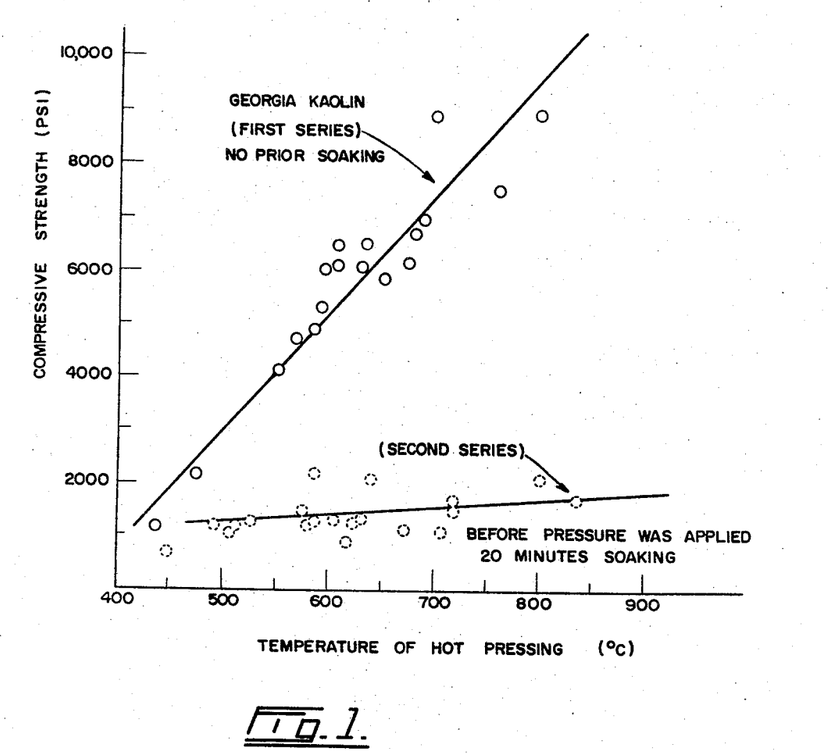
FIGURE 1 is a graph wherein the compressive strength of clay samples is plotted against the temperature of hot pressing, with one series of samples, as represented by solid circles, having been subjected to the process of the present invention and a second series of samples, as represented by dashed-line circles, being obtained by a process which lies outside the process of the present invention.

The results of the crushing strength measurement obtained for Georgia kaolin are illustrated in the graph constituting FIGURE 1 where strength in p.s.i. is plotted against temperature of hot-pressing in ° C., both series of tests being illustrated. On referring to FIGURE 1 it is immediately obvious that there was substantially no increase in crushing strength obtained in the second series of tests when specimens were soaked for 20 minutes at the indicated temperature before any pressure was applied. On the other hand, the cold crushing strength of Georgia kaolin can be increased from 1000 p.s.i. for the specimens pressed while heating to 450° C. (as shown) to about 8000 p.s.i. for the specimens pressed while heating to 700° C. if pressure is applied from the beginning of the heating period. Comparing this with known processes it was found that when similar specimens of Georgia kaolin were sintered in a furnace at a temperature of 1300° C. for 30 minutes a compressive strength of only about 2000 p.s.i. was obtained. Of substantial significance here is the high temperature necessary for sintering the Georgia kaolin and the relatively low compressive strength obtained at this high temperature.

A typical chemical analysis for Georgia kaolin is as follows:

| | Percent by weight |
|---|---|
| $SiO_2$ | 45.8 |
| $Al_2O_3$ | 38.5 |
| $Fe_2O_3$ | 0.7 |
| $TiO_2$ | 1.4 |
| $H_2O$ | 13.6 |

Although the weight loss on dehydroxylation which is theoretically possible for pure kaolinite is 13.9 percent, the percent weight loss obtained experimentally for Georgia kaolin was from 13.6 to 13.7 percent.

Figure 2:
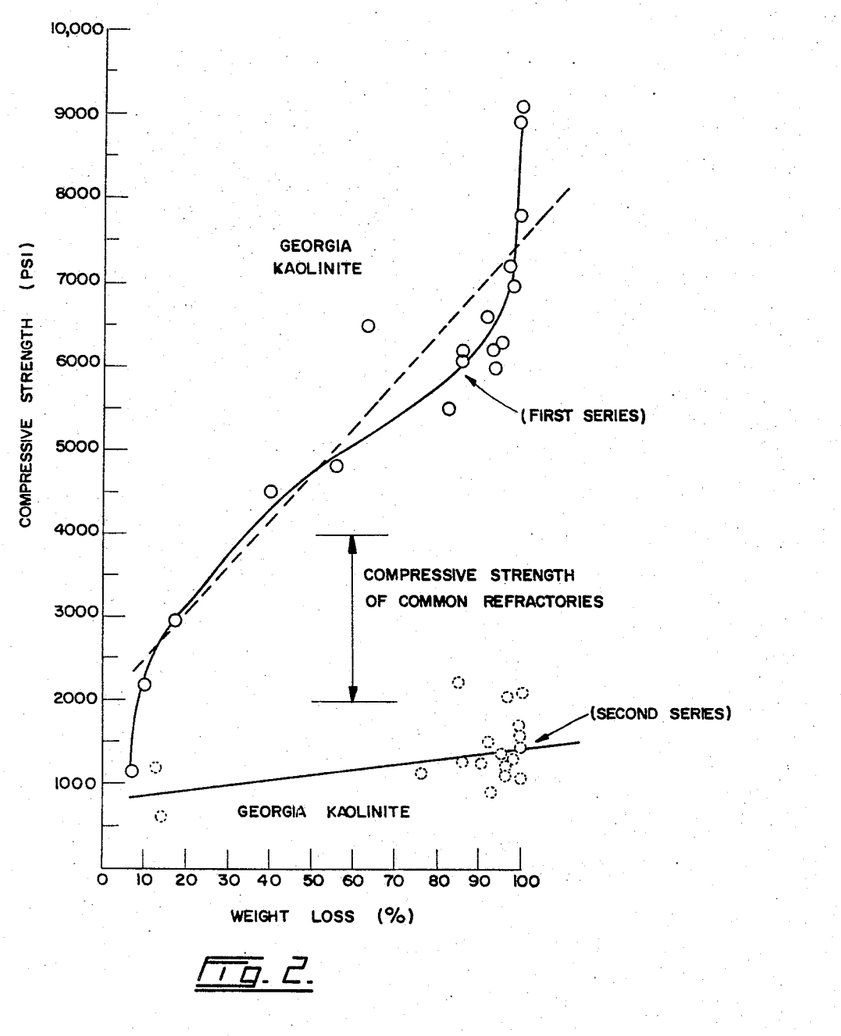
FIGURE 2 is a graph wherein the weight loss of clay samples is plotted against their compressive strength using the same two series of samples as in FIGURE 1, represented in the same manner as in FIGURE 1.

From the weight loss measurements taken it is believed that the extent of the dehydroxylation reaction can be determined. On the assumption that 13.6 is the possible weight loss in Georgia kaolin and using this value as the possible 100 percent weight loss, the percent weight loss of all specimens were calculated and in FIGURE 2 the percent weight loss is plotted against the compressive strength of the specimen for both series. As was to be expected from the suggested theoretical basis for the surprising results obtained in carrying out the process of the present invention, for the first series the higher the percentage of weight loss the higher the compressive strength which would appear to indicate that the higher the percentage of weight loss the greater the reaction in the specimen. On the other hand for the second series the lack of increase in compressive strength is striking which appears to indicate that the suggested increase in reactivity resulting during dehydroxylation is very short-lived and apparently vanished almost completely during 20 minutes, the soaking period used for the second series prior to pressure being applied.

EXAMPLE 2

Figure 3:
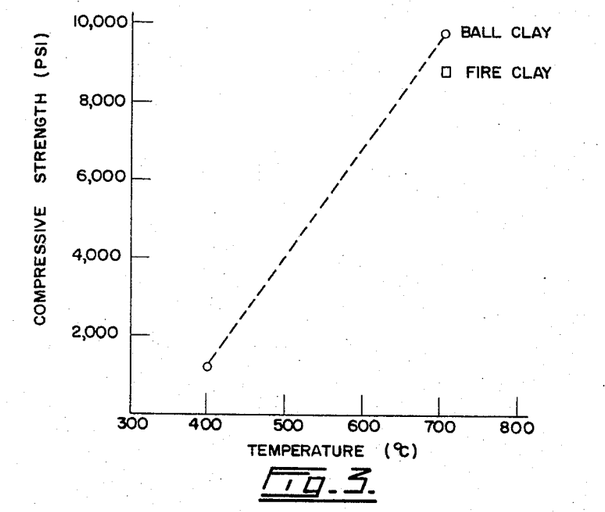
FIGURE 3 is a graph plotting the compressive strength against temperature of samples of ball clay, as represented by the solid line circles, and fire clay as represented by the solid line square.

Using the same procedure utilized in Example 1, similar substantial increases in compressive strengths were observed for both Kentucky ball clay and Abbotsford fire clay, as illustrated in FIGURE 3 of the drawings and noted below.

Kentucky ball clay—hot pressed with pressure 3,500 p.s.i. for 10 minutes (during dehydroxylation reaction) at 700° C.—compressive strength 10,000 p.s.i.

B.C. illitic clay—hot pressed wtih pressure of 3,500 p.s.i. for 10 minutes (during dehydroxylation reaction) at 650° C.—compressive strength 9,000 p.s.i.

EXAMPLE 3

This example is of particular significance in that it indicates the optimum conditions with respect to time, temperature and pressure required to obtain the most dense and strongest product from one particular fire clay normally used commercially for fire clay refractories. Also the effect of these variables on the bulk density and compressive strength of the product is illustrated.

The raw material employed was fire clay from Sumas Mountain, Abbotsford, British Columbia, Canada, which on analysis yielded the following information.

TABLE 1

| Chemical analysis: | Percent |
|---|---|
| $SiO_2$ | 57.20 |
| $Al_2O_3$ | 28.40 |
| $TiO_2$ | 1.82 |
| $Fe_2O_3$ | 2.05 |
| CaO | 0.80 |
| MgO | 0.50 |
| Alkalies | 0.96 |
| Loss on ignition | 9.00 |

| Mineralogical constituents: | Percent |
|---|---|
| Quartz | 38 |
| Kaolin | 52 |
| Micaceous minerals and carbonates | 10 |

Particle size Distribution (microns)—Only clay mineral fraction:

| 10% | Above $10\mu$. |
|---|---|
| 30% | $1-10\mu$. |
| 60% | Below $1\mu$. |

The induction heating apparatus described previously with respect to Example 1 was also used in this series of tests but in addition to the graphite die a special high-temperature tool steel die was made and used for the purpose of extending the temperature range up to 950° C. and the pressure range up to 25,000 p.s.i.

The particular fireclay used was received in the form of a single piece of material weighing about five pounds. This was ground in a porcelain mortar and pestle to pass through a 100 mesh sieve and subsequently subjected to the same procedure as outlined in Example 1.

The following series of experiments were carried out.

(a) First Series:
 Temperature variable
 Applied Pressure =13,700 p.s.i. (constant)
 Time of Hot Pressing=20 minutes (constant)
(b) Second Series:
 Time variable
 Applied Pressure=13,700 p.s.i. (constant)
 Temperature=700±3° C. (constant)
(c) Third Series:
 Applied Pressure variable
 Temperature=700±3° C. (constant)
 Time=15 minutes (constant)
(d) Fourth Series:
 Temperature variable
 Applied Pressure=15,000 p.s.i. (constant)
 Time—no soaking time.

The bulk density and compressive strength (in an Instron machine) of all the products obtained under all of the experimental conditions were determined and the results were as follows:

*First series*

Figure 4:
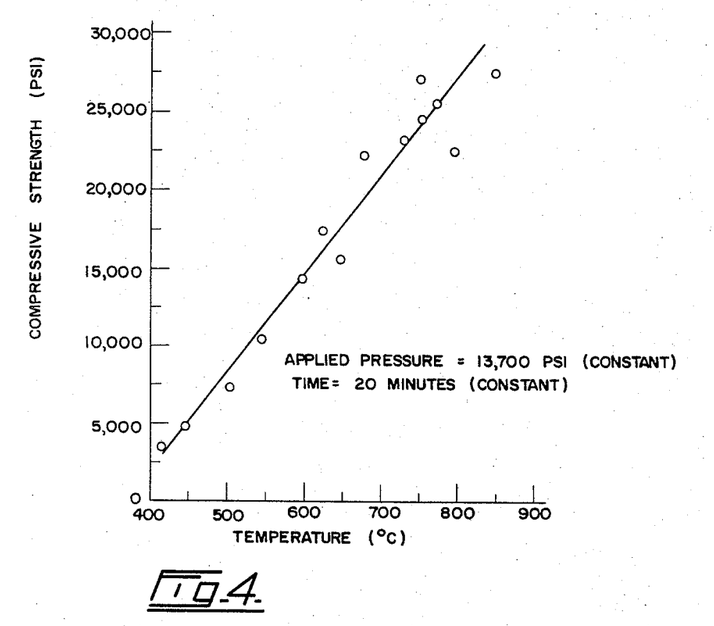
FIGURE 4 is a graph wherein the results of compressive strength measurements obtained on fire clay samples as represented by the solid line circles using the process of the present invention with a constant pressure and time, are plotted as a function of temperature.
Figure 5:
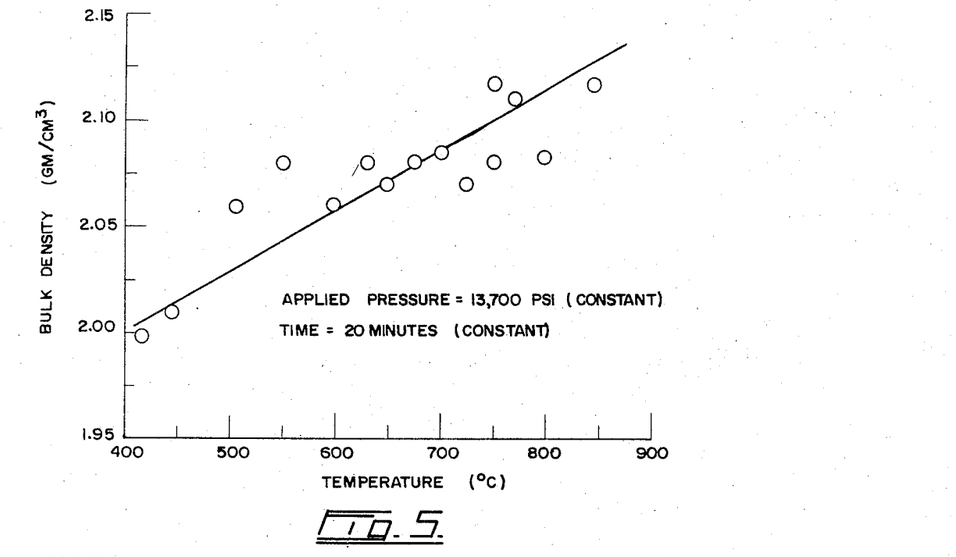
FIGURE 5 is a graph wherein the change in bulk density of the products of the samples in FIGURE 4 are plotted as a function of temperature.

The results of the compressive strength measurement obtained for the fireclay for a constant pressure and time are plotted as a function of temperature in FIGURE 4. Similarly the change of bulk density of the product as a function of temperature is shown in FIGURE 5. The generally linear relationship shown in these figures is seen to be very similar to that of Georgia kaolin under similar conditions. However in the case of fireclay, compressive strengths of up to 27,500 p.s.i. were obtained at an applied pressure of 13,700 p.s.i. at or above 750° C., in comparison with a compressive strength of 8000 p.s.i. at 700° C. for an applied pressure of 3500 p.s.i. in the case of Georgia kaolin.

These figures also indicate that the compressive strength and bulk density of the products are proportional to the maximum temperature employed where the time and pressure are constant.

*Second series*

Figure 6:
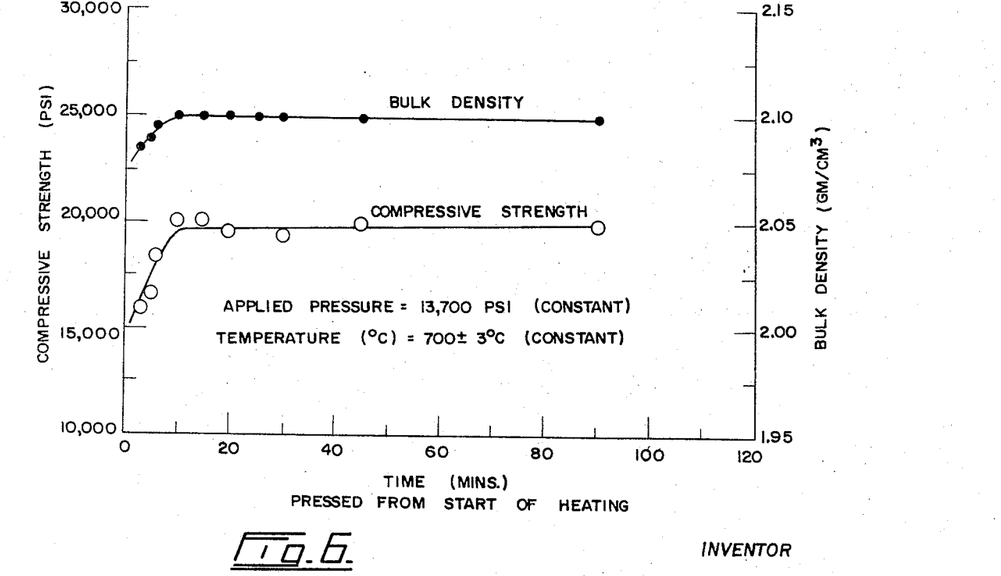
FIGURE 6 is a graph wherein the change in bulk density and compressive strength is plotted as a function of time at a constant temperature and pressure for fire clay samples as represented in one instance by solid line circles and in another instance by solid dots, the samples being prepared by the process of this invention.

The change in bulk density and compressive strength as a function of time at a constant temperature and pressure is shown in FIGURE 6. It is apparent from the figure that maximum density and strength in the product can be obtained within 5 to 10 minutes of the beginning of the process in that between 10 and 90 minutes after beginning the process there is substantially no change in these values. Thus at a constant temperature and pressure, time does not effect significantly the properties of the product although of course the product must be subjected to the necessary pressure and temperature for the time necessary to bring the product up to the temperature required.

*Third series*

Figure 7:
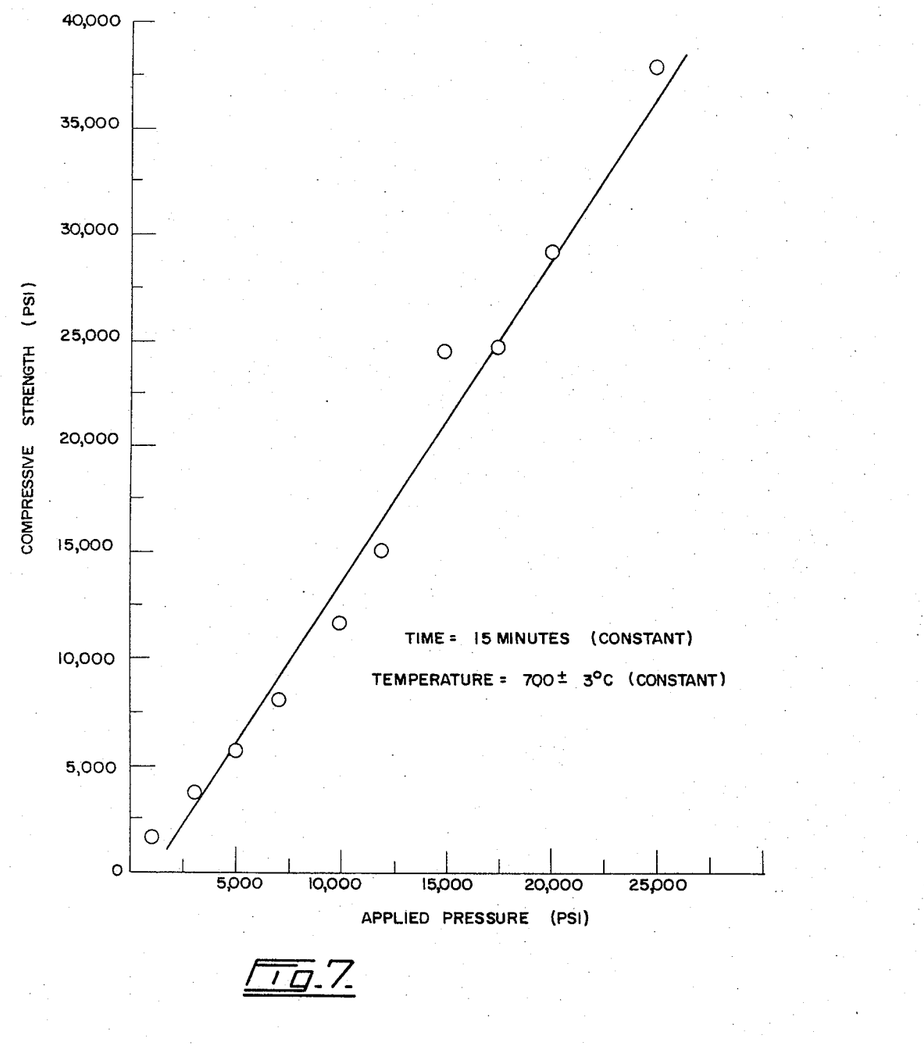
FIGURES 7 and 8 are graphs wherein compressive strength, and bulk density respectively of fire clay samples subjected to the process of the present invention and represented by the solid line circles are plotted against applied pressure with the time and temperature being constant.
Figure 8:
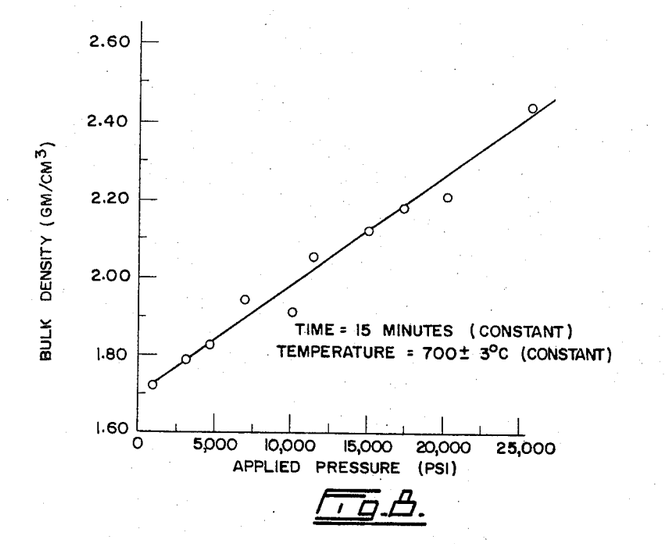

The effect of applied pressure on the compressive strength and bulk density of the products with time and temperature being constant is shown in FIGURES 7 and 8 which indicate that both these properties are directly proportional to the applied pressure. Of particular significance is that this result indicates that it is possible to prepare by the process of the present invention fireclay refractories or building bricks having a compressive strength of up to 40,000 p.s.i., which is far in excess of currently available commercial products, if necessary at a temperature of no more than 700° C. and in about 15 minutes. Also of significance is the high bulk density obtained, this being considerably higher than that for commercially available fireclay refractories which have a bulk density normally of the order of 2.00±0.1 gram/cm.$^3$.

*Fourth series*

Figure 9:
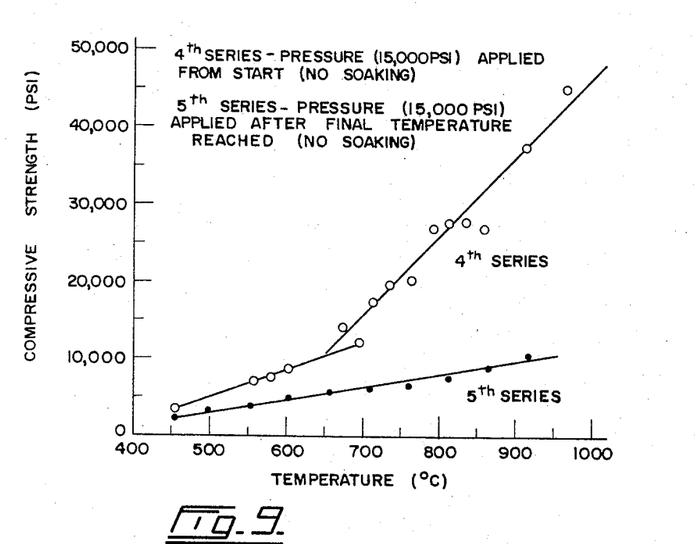
FIGURE 9 is a graph wherein compressive strength is plotted against temperature for two series of samples, a fourth and a fifth, with the fourth series of samples as represented by the solid line circles being those subjected to the process of the present invention and the fifth series of samples as represented by the solid dots being samples subjected to a process lying outside of that of the present invention.
Figure 10:
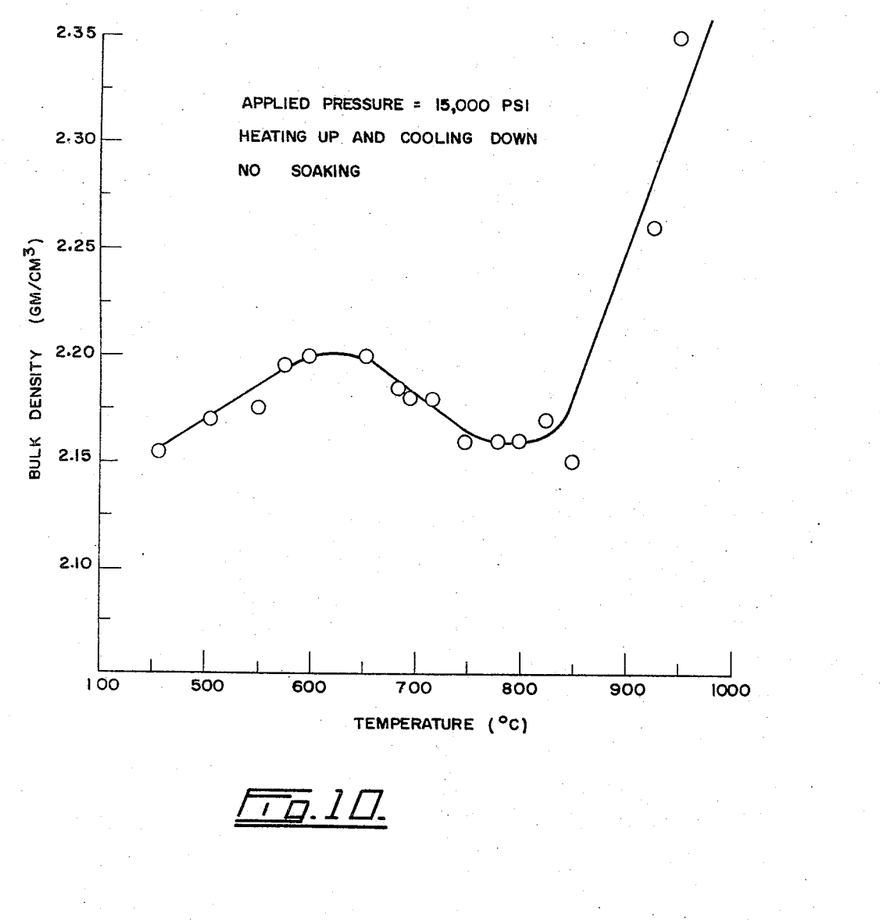
FIGURE 10 is a graph wherein the density of samples subjected to the process of the present invention and represented by the solid line circles is plotted against temperature.

In the second series where time was the variable it was indicated that maximum density and strength in the products were reached within 5 to 10 minutes. In order to further substantiate this, tests constituting the fourth series were carried out without any soaking time at any temperature. In this series the specimens were pressed at the noted pressure from the start of heating and the desired temperature was achieved as quickly as possible and then the heat source cut off as soon as the product reached the desired temperature. In these tests the time taken to reach the desired temperature varied from about 1 minute for 450° C. to about 3 minutes for 950° C. The results are shown in FIGURES 9 and 10 and it will be noted that specimens having a compressive or crushing strength of up to 45,000 p.s.i. can be prepared without any soaking at the temperature just by heating the raw material up to 950° C. under an applied pressure of 15,000 p.s.i. and cooling. Even at 800° C. the compressive strength of the specimen which was merely heated to the noted temperature under pressure and cooled, was of the order of 30,000 p.s.i. Thus it is seen that the desirable characteristics obtained in products prepared by the process of the present invention are independent of soaking at any particular temperature.

As a comparison with the fourth series of tests a fifth series was conducted wherein no pressure was applied until after the product had reached its final temperature. The results of this test are also shown in FIGURE 9 wherein it will be seen that when pressure is applied after the specimen has reached its final temperature the surprising results of the invention are not obtained and the result is a product having a substantially lower compressive strength than a similar product prepared according to the process of the present invention.

In summary the present invention provides a process for preparing improved clay products which process makes it possible to produce clay products within a time of the order of 5 to 10 minutes using various pressures normally of the order of 15,000±5,000 p.s.i. and substantially decreased temperatures of the order of 700±300° C., as compared with known processes.

We claim:
1. A process for manufacturing clay products comprising heating a formed composition containing at least a substantial proportion of natural, non-calcined clay to a temperature sufficient to cause at least some dehydroxylation of said clay to occur, said temperature being less than 1000° C., and applying pressure to said composition while dehydroxylation of said clay is occurring.

2. A process for manufacturing clay products comprising forming under pressure a composition containing at least a substantial proportion of natural, non-calcined clay, heating the composition so formed up to a temperature sufficient to cause at least some dehydroxylation of said clay to occur said temperature being less than 1000° C., and applying pressure to said composition while dehydroxylation of said clay is occurring.

3. A process for manufacturing clay products comprising forming under pressure in a die a composition containing at least a substantial proportion of natural non-calcined clay and while maintaining said composition under pressure in the die, heating it to a temperature sufficient to cause at least some dehydroxylation of said clay to occur, said temperature being less than 1000° C.

4. The process of claim 1 wherein said temperature is at least about 450° C.

5. The process of claim 1 wherein the temperature is less than 800° C.

6. The process of claim 1 wherein the pressure used is from 500 to 25,000 p.s.i.

7. The process of claim 1 wherein a kaolinitic clay is used.

8. The process of claim 1 wherein an Illitic clay is used.

9. An improved structural clay product characterized by having a compression strength in excess of 7000 p.s.i. up to about 40,000 p.s.i. and having been reactive hot pressed from non-calcined clay at its dehydroxylation temperature below normal clay firing temperatures.

References Cited

UNITED STATES PATENTS

| | | | |
|---|---|---|---|
| 2,892,955 | 6/1959 | Gulton. | |
| 2,990,602 | 7/1961 | Brandmayr et al. | 264—66 XR |
| 3,054,685 | 9/1962 | Shell | 264—65 XR |
| 3,098,699 | 7/1963 | Roy | 264—332 |

OTHER REFERENCES

Accary, et al.: Study of Mechanism of Reaction Hot Pressing, Journal American Ceramic Society, vol. 45, July 1962, pages 347–351.

ROBERT F. WHITE, *Primary Examiner.*

J. A. FINLAYSON, *Assistant Examiner.*